United States Patent
Lee et al.

(10) Patent No.: US 12,031,876 B2
(45) Date of Patent: Jul. 9, 2024

(54) SENSOR MODULE AND AUTO DEFOG SENSOR

(71) Applicant: SENSIRION AUTOMOTIVE SOLUTIONS KOREA CO., LTD., Seoul (KR)

(72) Inventors: Junyoup Lee, Seoul (KR); BumHee Hong, Incheon (KR); Taejung Kim, Seoul (KR)

(73) Assignee: SENSIRION AUTOMOTIVE SOLUTIONS KOREA CO., LTD., Seoul (KR)

( * ) Notice: Subject to any disclaimer, the term of this patent is extended or adjusted under 35 U.S.C. 154(b) by 526 days.

(21) Appl. No.: 17/414,311

(22) PCT Filed: Oct. 28, 2019

(86) PCT No.: PCT/KR2019/014250
§ 371 (c)(1),
(2) Date: Jun. 15, 2021

(87) PCT Pub. No.: WO2020/105881
PCT Pub. Date: May 28, 2020

(65) Prior Publication Data
US 2022/0373405 A1    Nov. 24, 2022

(30) Foreign Application Priority Data

Nov. 22, 2018  (KR) .......................... 10-2018-0145476

(51) Int. Cl.
*G01K 7/22*    (2006.01)
*G01K 1/08*    (2021.01)
*B60H 1/00*    (2006.01)

(52) U.S. Cl.
CPC ................. *G01K 7/22* (2013.01); *G01K 1/08* (2013.01); *B60H 1/00785* (2013.01)

(58) Field of Classification Search
None
See application file for complete search history.

(56) References Cited

U.S. PATENT DOCUMENTS 6,422,062 B1    7/2002   King et al.
7,770,443 B2    8/2010   Varpula et al.
(Continued)

FOREIGN PATENT DOCUMENTS

EP   1700724 A2 *  9/2006  ......... B60H 1/00785
JP   2010-043930 A   2/2010
(Continued)

OTHER PUBLICATIONS

International Search Report dated Feb. 3, 2020 for PCT/KR2019/014250 and its English translation.

*Primary Examiner* — Erica S Lin
(74) *Attorney, Agent, or Firm* — Insight Law Group, PLLC; Seung Lee

(57) ABSTRACT

The present invention relates to a sensor module and an auto defog sensor. The sensor module includes a housing, a flexible substrate, and a temperature sensor. The housing has a contact face arranged and configured for installation on a surface, wherein the contact face of the housing has an opening. A flexible substrate has a base substrate part fixed inside the housing and a curved substrate part which extends in a bent form from the base substrate part and has an extension end fixed inside the housing so that a contact part of the curved substrate part is withdrawn via the opening of the housing and configured to press against the surface. The temperature sensor is arranged on or in the contact part of the curved substrate part and configured to measure a temperature of the surface.

19 Claims, 7 Drawing Sheets

(56) References Cited

U.S. PATENT DOCUMENTS

2010/0206047 A1*  8/2010  No ..................... G01D 21/02
                                                    73/29.02
2012/0006907 A1   1/2012  Niemann et al.

FOREIGN PATENT DOCUMENTS

| JP | 2010-540340 A | 12/2010 |
| JP | 2012-066806 A | 4/2012 |
| JP | 2012-233862 A | 11/2012 |
| KR | 10-1499746 B1 | 3/2015 |
| KR | 10-2017-0018546 A | 2/2017 |

* cited by examiner

SENSOR MODULE AND AUTO DEFOG SENSOR

TECHNICAL FIELD

The present invention relates to a sensor module capable of accurately and rapidly measuring a temperature of a surface and to an auto defog sensor (ADS) comprising such a sensor module. The ADS is capable of effectively predicting and/or detecting fogging of a surface.

BACKGROUND ART

Generally, ADSs for predicting and/or detecting fogging on a surface are known. Relevant surfaces include windshields, windows and mirrors. An ADS may be employed to predict and/or detect fogging on a windshield of a vehicle or on a mirror e.g. in the bathroom. Such ADSs predict and/or detect fogging, which begins to form on the surface, and may in association with a heating and/or an air conditioning system automatically prevent or remove the fogging. In a vehicle an ADS may be employed on the windshield of the vehicle, thereby allowing a driver to drive safely.

Such ADSs have already been disclosed domestically and internationally. An example thereof includes an ADS disclosed in U.S. Pat. No. 6,422,062. This ADS includes a glass temperature sensor, a relative humidity sensor, and an ambient air temperature sensor, and to calculate a relatively accurate dew point value, the relative humidity sensor and the ambient air temperature sensor are located to be adjacent to each other so as to measure a humidity level and a temperature at the same point.

However, according to the related art, a surface temperature is generally measured by a temperature sensor being adhered to the surface by an adhesive member. Thus, there is a concern that a gap may be generated between the temperature measurement unit and the adhesive member due to various reasons such as the glass surface being curved or foreign substances being introduced between the temperature measurement unit and the adhesive member. Then, an error may occur in the measured surface temperature, and fog may not be effectively predicted and/or detected.

Another example includes an ADS disclosed in U.S. Pat. No. 7,770,433. Here, a surface temperature is measured by a temperature sensor, which is pressed against the windshield by a spring. This spring enables a good thermal contact between the temperature sensor and the windshield but it has a high thermal mass and it provides a strong thermal contact to the sensor. Thus, the temperature sensor may react slower to changes of the temperature of the windshield and the measured temperature may less accurately correspond to the temperature of the windshield. Additionally, the spring and the assembly of the spring may be complex and costly.

DISCLOSURE OF INVENTION

Technical Problem

The present invention is directed to providing a sensor module capable of accurately and rapidly measuring a temperature of a surface. Furthermore, it is an object of the present invention to provide an auto defog sensor with improved manufacturability that is capable of accurately and rapidly predicting and/or detecting fogging of a surface.

Solution to Problem

These objects are achieved by a sensor module having the features of claim 1 and by an auto defog sensor having the features of claim 14, respectively. Further embodiments of the invention are laid down in the dependent claims.

To achieve the above object, the sensor module includes a housing, a flexible substrate, and a temperature sensor. The housing has a contact face arranged and configured for installation on a surface, wherein the contact face of the housing has an opening. A flexible substrate has a base substrate part fixed inside the housing and a curved substrate part which extends in a bent form from the base substrate part and has an extension end fixed inside the housing so that a contact part of the curved substrate part is withdrawn via the opening of the housing and configured to press against the surface. The temperature sensor is arranged on or in the contact part of the curved substrate part and configured to measure a temperature of the surface.

Embodiments of the present invention are stated in the corresponding sub claims and are described below.

In a preferred embodiment, the contact part of the curved substrate part presses against the surface only by means of the curvature and the elasticity of the flexible substrate. An advantage of this embodiment may be that additional parts may be spared and that thereby the thermal mass is reduced and thereby the response time to temperature changes is shorten.

The curved substrate part is guided to be bent from the base substrate part by a guiding block which is arranged inside the housing. An advantage of this embodiment may be that the thermal contact of the temperature sensor to the surface is increased and remains reliable over time. Therefore, accuracy and reliability may be increased.

In a preferred embodiment, the flexible substrate is a flexible printed circuit board (FPCB).

In a preferred embodiment, the flexible substrate may include a stiffener laminated at the extension end of the curved substrate part and/or laminated at the base substrate part. In a preferred embodiment, the curved substrate part may include a pair of fixing pieces protruding from both sides of the extension end.

In a preferred embodiment, the housing may include a pair of fitting pieces protruding from an inner wall of the housing so that a central portion of the extension end of the curved substrate part is fitted therebetween, and a pair of hooks protruding from the inner wall of the housing so that the fixing pieces are respectively hung thereon and fixed.

In a preferred embodiment, the temperature sensor may be formed as a thermistor. Advantages of a thermistor may be that it may be cheap and that it may have a small thermal mass and that it may therefore have a fast response time.

An auto defog sensor comprises the sensor module and further comprises a humidity sensor arranged and configured to measure an ambient humidity.

In an embodiment, the temperature sensor is integrated in a semiconductor chip and the humidity sensor is integrated in the same semiconductor chip. An advantage of this embodiment is that temperature and humidity are directly measured at the surface ("direct ADS") and that therefore only one single temperature sensor is required. By using the same, single, small semiconductor chip for the temperature and the humidity, the size and therefore the thermal mass may be small and therefore the response time may be fast.

In another embodiment, the auto defog sensor further comprises a second temperature sensor mounted on the base substrate part which is arranged and configured to measure an ambient temperature and wherein the humidity sensor is mounted on the base substrate part ("indirect ADS"). For this embodiment, preferably, the second temperature sensor is integrated in a semiconductor chip and the humidity sensor is integrated in the same semiconductor chip.

Advantageous Effects of Invention

Advantages of this embodiment ("indirect ADS") may be that the thermal mass of the temperature sensor may be even smaller than in the embodiment above ("direct ADS") because the humidity sensor is arranged separately. Additionally, not only the surface temperature but also an ambient temperature can be measured, which may be of additional interest to the user.

BRIEF DESCRIPTION OF DRAWINGS

The above and other objects, features and advantages of the present invention will become more apparent to those of ordinary skill in the art by describing exemplary embodiments thereof in detail with reference to the accompanying drawings, in which.

MODE FOR THE INVENTION

Figure 1:
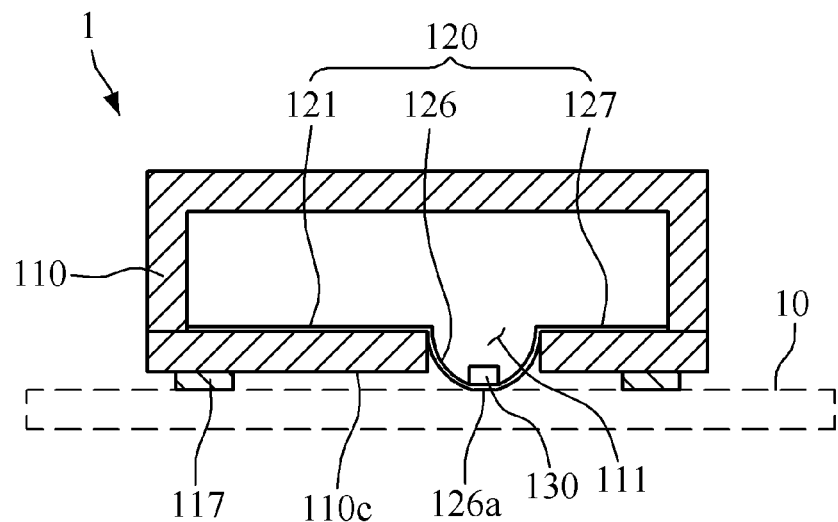
FIG. 1 is a longitudinal cross-sectional view of a sensor module according to an embodiment of the present invention.

The present invention will be described in detail below with reference to the accompanying drawings. Here, like configurations will be denoted by like reference numerals, repetitive description will be avoided, and detailed description of known functions and configurations that may unnecessarily blur the gist of the present invention will be omitted. Embodiments of the present invention are provided to more fully describe the present invention to those of ordinary skill in the art. Therefore, the shape, sizes, or the like of the elements in the drawings may be exaggerated for clarity of description.

FIG. 1 is a longitudinal cross-sectional view of a sensor module according to an embodiment of the present invention. Referring to FIG. 1, a sensor module 1 includes a housing 110, a flexible substrate 120, and a temperature sensor 130.

The housing 110 has a contact face 110c arranged and configured for installation on a surface 10. The surface 10 may include a windshield, a window and a mirror. The contact face 110c of the housing 110 has an opening 111. An adhesive member 117 is disposed to adhere the contact face 110c of the housing 110 to the surface 10.

The housing 110 has an inner space. The housing 110 fixes and supports a base substrate part 121 of the flexible substrate 120 therein. Accordingly, the housing 110 may accommodate and protect the base substrate part 121. The opening 111 may be formed in a portion of the housing 110 facing the surface 10. The housing 110 withdraws a part of a curved substrate part 126 of the flexible substrate 120 via the opening 111.

The flexible substrate 120 has the base substrate part 121 and the curved substrate part 126. The base substrate part 121 is fixed inside the housing 110. Accordingly, the flexible substrate 120 may be supported in the housing 110 by the base substrate part 121. The base substrate part 121 has a form in which a circuit is configured on a substrate formed of a material having a property of being curved.

The curved substrate part 126 extends in a bent form of being curved from the base substrate part 121 and has an extension end 127 fixed inside the housing 110 so that a contact part 126a of the curved substrate part 126 is withdrawn via the opening 111 of the housing 110 and configured to press against the surface 10. The contact part 126a of the curved substrate part 126 presses against the surface 10 only by means of the curvature and the elasticity of the flexible substrate 120. Accordingly, the curved substrate part 126 may be curved in a natural form and have its own tension.

The curved substrate part 126 is integrally formed with the base substrate part 121, has a property of being curved, and is connected in circuit with the base substrate part 121. The flexible substrate 120 may be a flexible printed circuit board.

The curved substrate part 126 is curved and deformed when in contact with the surface 10 while the contact part 126a is withdrawn via the opening 111 of the housing 110 so that the curved substrate part 126 remains adhered to the surface 10 due to its own tension. Accordingly, even when the surface 10 is curved, the contact part 126a of the curved substrate part 126 is deformed corresponding to the curved form of the surface 10 so that the curved substrate part 126 is adhered to the surface 10 due to its own tension.

That is, when the contact part 126a is in contact with the surface 10, the curved substrate part 126 acts like a spring due to its own tension. Accordingly, the curved substrate part 126 improves thermal contact with the surface 10 even without an additional pressing means such as a spring or a pressing rod, and due to the omission of an additional pressing means, thermal mass may be minimized.

The temperature sensor 130 is arranged on or in the contact part 126a of the curved substrate part 126 and is configured to measures a temperature of the surface 10. That is, the temperature sensor 130 measures the temperature of the surface 10 through the curved substrate part 126 while the contact part 126a of the curved substrate part 126 is in contact with the surface 10.

As described above, the sensor module 1 according to the embodiment of the present invention uses a single flexible substrate 120 having a relatively small thickness to measure the temperature of the surface 10. Accordingly, thermal mass may be reduced in comparison to when a hard printed circuit board (HPCB) is used.

In addition, in the embodiment of the present invention, since the single flexible substrate 120 is used to manufacture the base substrate part 121 and the curved substrate part 126 in an integrated form, manufacturability may be improved in comparison to when the base substrate part 121 is manufactured using a HPCB, the curved substrate part 126 is manufactured using a flexible substrate, and the base substrate part 121 and the curved substrate part 126 are connected by soldering or the like.

According to the embodiment of the present invention, when the contact part 126a of the curved substrate part 126 is in contact with the surface 10 while being withdrawn via the opening 111 of the housing 110, the curved substrate part 126 may remain adhered to the surface 10 due to its own tension regardless of the curved form of the surface 10. Accordingly, since the temperature sensor 130 may promptly and accurately measure the temperature of the surface 10 through the curved substrate part 126, a prompt and accurate response is performed according to changes in fog conditions so that fog may be effectively removed from the surface 10.

Figure 2:
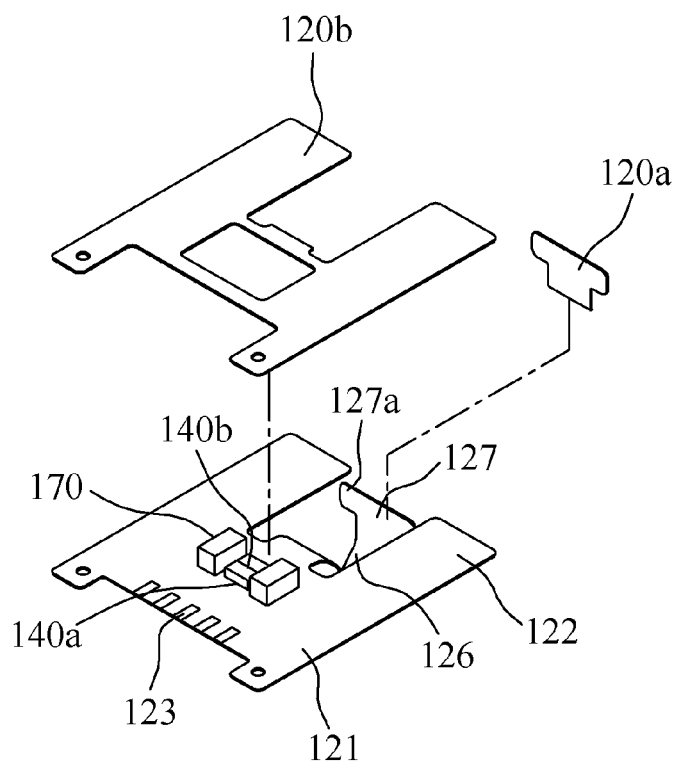
FIG. 2 is an exploded perspective view of a flexible substrate in FIG. 1.

FIG. 2 is an exploded perspective view of a flexible substrate in FIG. 1. Referring to FIG. 2, the flexible substrate 120 may include a stiffener 120a laminated on at least part of the extension end 127 of the curved substrate part 126. The stiffener 120b may be further laminated on at least part of the base substrate part 121. The stiffener 120a may be laminated on fixing pieces 127a of the curved substrate part 126. In addition, the stiffener 120b may be laminated on an surface of the base substrate part 121 excluding a region in which a second temperature sensor 140a, a humidity sensor 140b and a control circuit module 170 are mounted and a region in which substrate terminals 123 are formed.

As described above, the extension end 127 of the curved substrate part 126 and the base substrate part 121 are fixed inside the housing 110 while being stiffened by the stiffener 120a. Thus, the curved substrate part 126 may more stably maintain the curved form. In addition, the curved substrate part 126 may have sufficient tension even when the curved substrate part 126 has a relatively short length.

Figure 3:
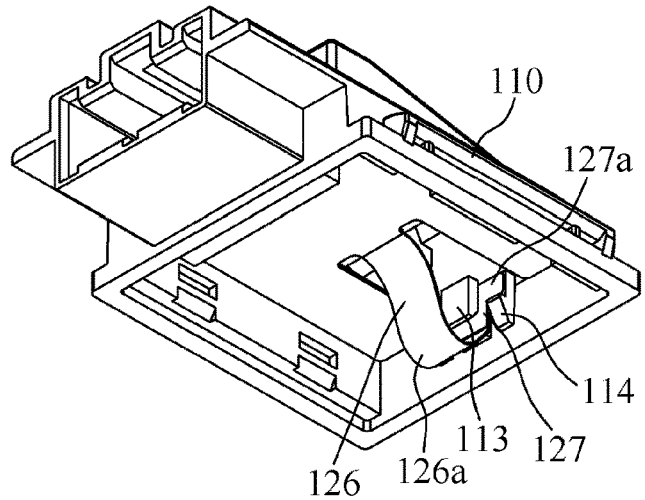
FIG. 3 is a perspective view illustrating a state in which a curved substrate part is fixed to a housing in FIG. 1.
Figure 4:
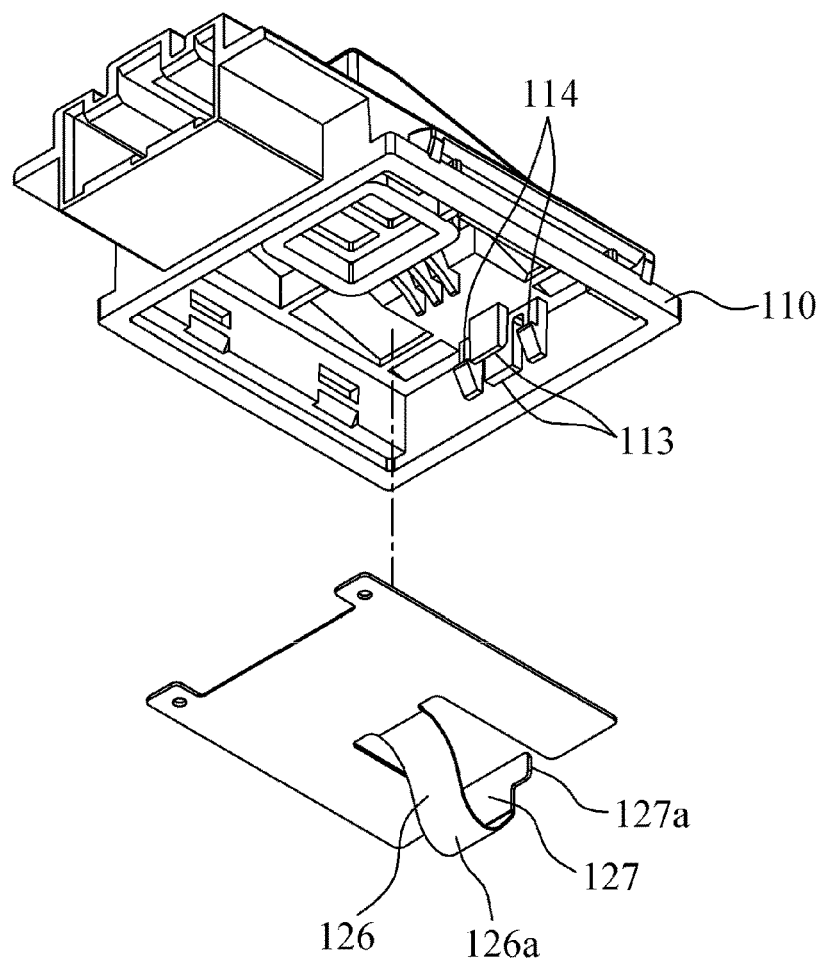
FIG. 4 is an exploded perspective view of FIG. 3.

FIG. 3 is a perspective view illustrating a state in which a curved substrate part is fixed to a housing in FIG. 1. FIG. 4 is an exploded perspective view of FIG. 3;

Referring to FIGS. 3 and 4, the curved substrate part 126 may include a pair of fixing pieces 127a protruding from both sides of the extension end 127. In addition, the housing 110 may include a pair of fitting pieces 113 and a pair of hooks 114.

The pair of fitting pieces 113 may protrude from an inner wall of the housing 110 so that a central portion of the extension end 127 of the curved substrate part 126 is fitted therebetween. The pair of hooks 114 protrude from the inner wall of the housing 110 so that the fixing pieces 127a are respectively hung thereon and fixed. Accordingly, since the fixing pieces 127a of the curved substrate part 126 are fixed by being respectively hung on the hooks 114 while the central portion of the extension end 127 of the curved substrate part 126 is fitted between the fitting pieces 113, the extension end 127 of the curved substrate part 126 may be fixed inside the housing 110.

As another example, although not illustrated, the curved substrate part 126 may have a fixing hole formed in the extension end 127, and a fixing protrusion configured to be fitted to the fixing hole may be formed inside the housing 110 so that the extension end 127 of the curved substrate part 126 is fixed inside the housing 110.

Figure 5:
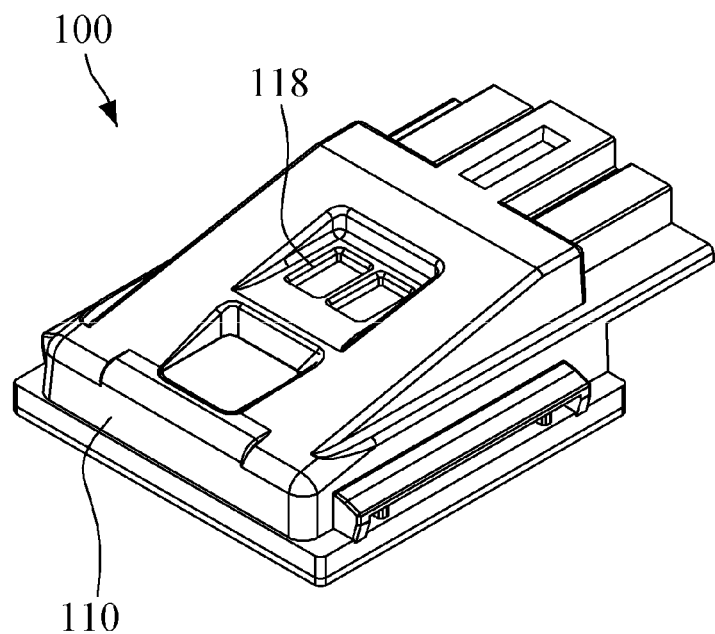
FIG. 5 is a perspective view of an auto defog sensor comprising the sensor module illustrated in FIG. 1.
Figure 6:
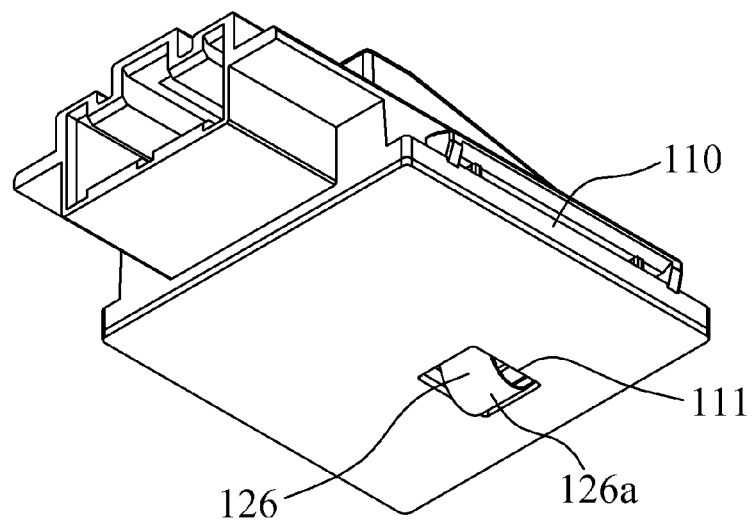
FIG. 6 is a perspective view illustrating a contact side of the auto defog sensor illustrated in FIG. 5.
Figure 7:
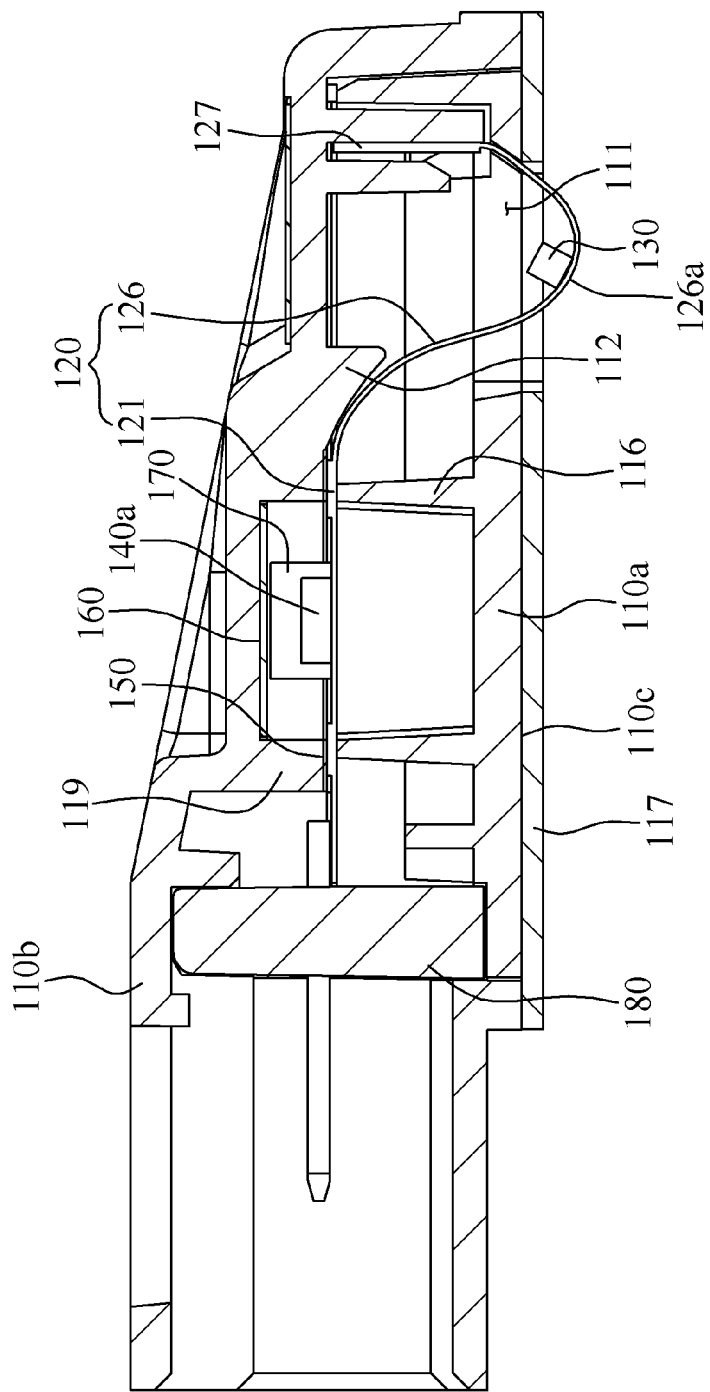
FIG. 7 is a longitudinal cross-sectional view of FIG. 5.
Figure 8:
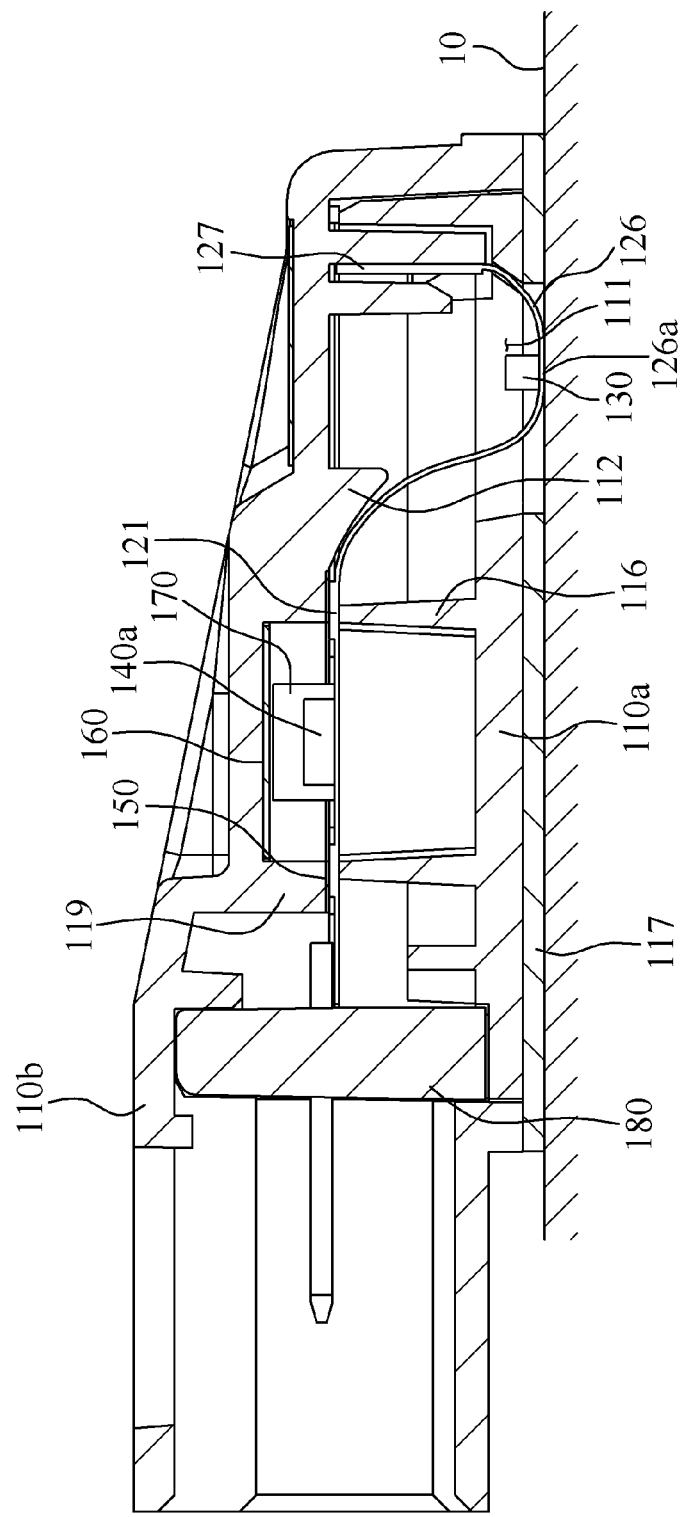
FIG. 8 is a longitudinal cross-sectional view illustrating a state in which an auto defog sensor is adhered to a surface in FIG. 7.
Figure 9:
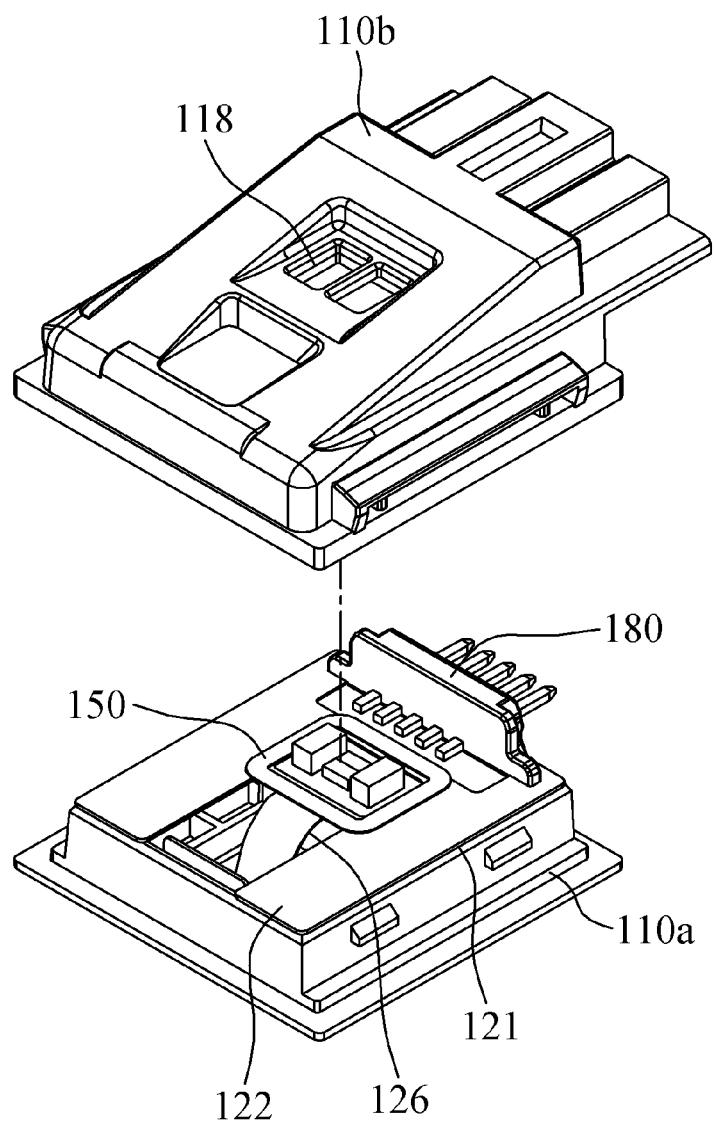
FIG. 9 is an exploded perspective view of a part of the auto defog sensor illustrated in FIG. 5.
Figure 10:
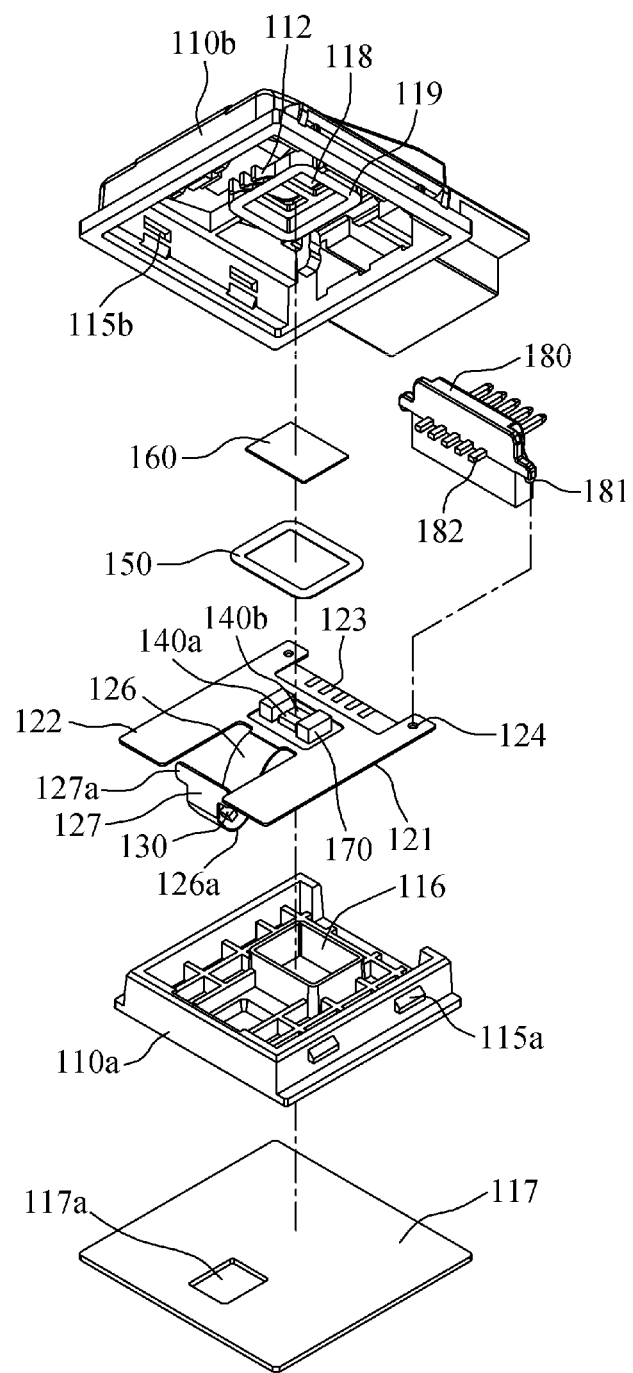
FIG. 10 is an exploded perspective view of FIG. 9.

FIG. 5 is a perspective view of an auto defog sensor comprising the sensor module illustrated in FIG. 1. FIG. 6 is a perspective view illustrating a contact side of the auto defog sensor illustrated in FIG. 5. FIG. 7 is a longitudinal cross-sectional view of FIG. 5. FIG. 8 is a longitudinal cross-sectional view illustrating a state in which an auto defog sensor is adhered to a surface in FIG. 7. FIG. 9 is an exploded perspective view of a part of the auto defog sensor illustrated in FIG. 5. FIG. 10 is an exploded perspective view of FIG. 9.

Referring to FIGS. 5 to 10, the housing 110 may include a housing main body 110a and a housing cover 110b. The housing main body 110a has the opening 111. The housing main body 110a has an open side which faces a side that comprises the opening 111. The housing cover 110b is configured to cover the open side of the housing main body 110a. The fitting pieces 113 and the hooks 114 are formed in an inner wall of the housing cover 110b.

The housing 110 has the form in which the housing main body 110a and the housing cover 110b are assembled to or separated from each other, thereby facilitating assembly of the flexible substrate 120, a connector 180, or the like accommodated in the housing 110.

The housing cover 110b may have a form in which the circumference of the housing cover 110b surrounds the circumference of the housing main body 110a. The housing main body 110a may have coupling protrusions 115a formed in an outer wall, and the housing cover 110b may have coupling grooves 115b formed in a circumferential inner wall so that the coupling protrusions 115a are respectively fitted thereto. The housing cover 110b may be easily adhered to or detached from the housing main body 110a by coupling or separation between the coupling protrusions 115a and the coupling grooves 115b.

The base substrate part 121 may be supported on the open side of the housing main body 110a. The housing main body 110a may include a hollow support part 116. The hollow support part 116 protrudes in a hollow form from an inner surface of the contact face 110c of the housing main body 110a, has an open side at the protruded end and is configured to support a central portion of the base substrate part 121. The hollow support part 116 may be formed in the shape of a quadrilateral container having a hollow.

As described above, the base substrate part 121 is supported by the open side of the housing main body 110a and the open side of the hollow support part 116. Thus, the base substrate part 121 and the curved substrate part 126 may be insulated from each other due to an enclosure of the housing main body 110a and the hollow of the hollow support part 116. Accordingly, the base substrate part 121 and the curved substrate part 126 are less affected by ambient heat such that the temperature sensor 130 is able to more accurately measure the temperature of the surface 10.

The housing main body 110a may be adhered to the surface 10 by the adhesive member 117. The adhesive member 117 is disposed to adhere the contact face 110c of the housing main body 110a to the surface 10. The adhesive member 117 has a size corresponding to that of the contact face 110c of the housing main body 110a, and the curved substrate part 126 may pass through a hole 117a of the adhesive member 117 formed in a portion corresponding to the opening 111 of the housing main body 110a.

Both surfaces of the adhesive member 117 have an adhesive property. The contact face 110c of the housing main body 110a is adhered to one adhesive surface of the adhesive member 117, and the surface 10 is adhered to the other adhesive surface of the adhesive member 117. The adhesive member 117 may be formed of a soft material so that the adhesive member 117 has a sufficient adhesive force even when the housing main body 110a is adhered to a curved or bent surface 10. For example, the adhesive member 117 may be formed as a double-sided tape.

Meanwhile, the temperature sensor 130 may be mounted in an opposite surface side of the contacted surface of the contact part 126a and be connected to a circuit of the curved substrate part 126. That is, the temperature sensor 130 is disposed opposite the surface 10 while the contact part 126a of the curved substrate part 126 is disposed therebetween. Accordingly, the temperature sensor 130 may receive heat of the surface 10 from the curved substrate part 126, which is in contact with the surface 10 and measure the temperature of the surface 10. To reduce thermal mass, it may be advantageous for the size of the temperature sensor 130 to be reduced. For example, the temperature sensor 130 may comprise or be a thermistor.

Meanwhile, the base substrate part 121 may include extending pieces 122. The extending pieces 122 respectively extend from both sides of the base substrate part 121 while the curved substrate part 126 is disposed therebetween, and the extending pieces 122 are fixed inside the housing 110. Accordingly, an area in which the base substrate part 121 is fixed inside the housing 110, i.e., fixed to the open side of the housing main body 110a, may be increased, and the base substrate part 121 may be more stably supported.

Each of the extending pieces 122 may extend while being spaced apart from the curved substrate part 126. Accordingly, the curved substrate part 126 may be smoothly deformed without interfering with the base substrate part 121. A connection portion at which the extending pieces 122 and the curved substrate part 126 are connected is processed to be round so that tearing of the connection portion is prevented.

Meanwhile, the curved substrate part 126 may extend with a width narrower than the width of the base substrate part 121. The tension of the curved substrate part 126 may decrease as the width of the curved substrate part 126 becomes narrower. Conversely, the tension of the curved substrate part 126 may increase as the width of the curved substrate part 126 is wider. Accordingly, the width of the curved substrate part 126 may be set to be in an optimal range in consideration of the tension of the curved substrate part 126. That is, the width of the curved substrate part 126 may be set to be in a range that satisfies a condition that the tension of the curved substrate part 126 be maintained to a set value or higher.

Portions of the curved substrate part 126 may be formed to have a constant width, excluding a portion connected to the base substrate part 121 and a portion fixed to the housing 110. The curved substrate part 126 may extend by being bent in the form of being inflected from the portion connected to the base substrate part 121 toward the contact part 126a.

The curved substrate part 126 may be guided to be bent to the surface 10 from the base substrate part 121 by a guiding block 112 which is arranged inside the housing 110. A protruded surface of the guiding block 112 is inclined in a direction in which the curved substrate part 126 extends. In addition, the contact part 126a of the curved substrate part 126 may be withdrawn in a convexly bent form from the opening 111 of the housing 110. Accordingly, the curved substrate part 126 may be curved in a natural form and have its own tension.

Meanwhile, the sensor module 1 further may comprise the connector 180. The connector 180 may be connected to the substrate terminals 123 of the base substrate part 121 by connector terminals 182 while the connector 180 is aligned by aligning protrusions 181 fitted to aligning holes 124 of the base substrate part 121. Here, the aligning holes 124 may be formed corresponding to the open side of the housing main body 110a, and the aligning protrusions 181 may be fitted thereto. A body portion of the connector 180 may be supported by being fitted to a rear end opening of the housing main body 110a so that the base substrate part 121 is adhered to the open side of the housing main body 110a.

Meanwhile, an auto defog sensor 100 comprises the sensor module 1, further may comprise the second temperature sensor 140a and the humidity sensor 140b.

The second temperature sensor 140a may be disposed on the base substrate part 121.

The second temperature sensor 140a may be mounted on the base substrate part 121 which is arranged and configured to measure an ambient temperature. The second temperature sensor 140a and the humidity sensor 140b may be used along with the temperature sensor 130 to accurately calculate a dew point value.

The humidity sensor 140b may be arranged and configured to measure an ambient humidity. The humidity sensor 140b may be mounted on the base substrate part 121. The humidity sensor 140b may be separated with the second temperature sensor 140a and be mounted on the base substrate part 121. Another example, the humidity sensor 140b may integrated with the second temperature sensor 140a or the temperature sensor 130. The temperature sensor 130 is integrated in a semiconductor chip and wherein the humidity sensor 140b is integrated in the same semiconductor chip. The second temperature sensor 140a is integrated in a semiconductor chip and wherein the humidity sensor 140b is integrated in the same semiconductor chip.

The auto defog sensor 100 may comprise an air inlet 118 and a hollow accommodating part 119. The air inlet 118 is formed in a side which faces the contact face 110c of the housing 110 corresponding to the second temperature sensor 140a on the basis of the state that the housing 110 is placed above the surface 10. The air inlet 118 allows air flowing along the surface 10 to be provided to the second temperature sensor 140a. The air inlet 118 may be divided into a plurality of compartments by partitions. The air inlet 118 may be formed in the housing cover 110b.

The hollow accommodating part 119 protrudes in a hollow form from a surrounding inner wall of the air inlet 118 and accommodates the second temperature sensor 140a. The hollow accommodating part 119 may be formed in the shape of a quadrilateral container having a hollow. The hollow accommodating part 119 may be formed to protrude from an inner wall of the housing cover 110b. While the housing cover 110b is mounted on the housing main body 110a, the protruded end of the hollow accommodating part 119 presses a faced surface of the base substrate part 121 via a sealing tape 150, thereby fixing the base substrate part 121 to the housing main body 110a.

The sealing tape 150 seals between the hollow accommodating part 119 and the base substrate part 121. The sealing tape 150 prevents introduction of foreign substances through a gap between the hollow accommodating part 119 and the base substrate part 121. The sealing tape 150 may be formed in the shape of a quadrilateral ring to correspond to the form of the protruded end of the hollow accommodating part 119. The sealing tape 150 may be adhered to at least one of the base substrate part 121 and the hollow accommodating part 119.

As described above, the second temperature sensor 140a is mounted in the base substrate part 121 disposed inside the housing 110 and is accommodated in the hollow accommodating part 119 while the temperature sensor 130 is mounted in the contact part 126a of the curved substrate part 126 withdrawn via the opening 111 of the housing 110. Thus, in addition to having different mounting heights, the second temperature sensor 140a and the temperature sensor 130 may be spatially divided. Accordingly, since measurement of temperature of the surface 10 and measurement of temperature of the indoor e.g. of the vehicle may be sufficiently separated, a prompt and accurate response may be performed according to changes in fog conditions.

A filter 160 may be installed in the air inlet 118. The filter 160 removes foreign substances from air introduced via the air inlet 118. The filter 160 may be disposed inside the air inlet 118. The filter 160 may be formed as a membrane filter.

The auto defog sensor 100 may comprise the control circuit module 170. The control circuit module 170 may be disposed on the base substrate part 121. The control circuit module 170 may be mounted on the base substrate part 121 and accommodated in the hollow accommodating part 119. The control circuit module 170 compares a dew point, which is obtained by computing a value measured by the second temperature sensor 140a and the humidity sensor 140b, with the temperature of the surface 10 measured by the temperature sensor 130 and selectively outputs a fog detection signal.

That is, the control circuit module 170 calculates a dew point on the basis of a generally-known formula which calculates a dew point from a relative humidity value and an indoor temperature value. Next, the control circuit module 170 compares the calculated dew point with the temperature of the surface, and when the dew point has a value higher than or equal to the temperature of the surface, the control circuit module 170 predicts that fog may be formed on the surface 10 and outputs a fog detection signal. The fog detection signal output as above is provided to an air conditioning system of the vehicle, thereby allowing air conditioning to be performed so that fog is not formed on the surface 10.

The connector 180 may be in charge of power supply and data input/output of the control circuit module 170. That is, the connector 180 may be connected via a wire harness to a control box configured to control electric components of the vehicle. Accordingly, when a fog detection signal is input from the control circuit module 170 to the control box via the connector 180, the control box may perform control to remove fog or prevent fogging on the surface 10 by performing dehumidification using the air conditioning system.

The present invention has been described above with reference to the embodiments illustrated in the drawings, but the description is merely illustrative, and one of ordinary skill in the art should understand that various modifications and other equivalent embodiments are possible from the description above. Therefore, the actual technical scope of the present invention should be defined on the basis of the claims below.

According to the present invention, thermal mass can be reduced in comparison to when a HPCB is used to measure a temperature of a surface.

According to the present invention, manufacturability can be improved in comparison to when a base substrate part is manufactured using a HPCB, a curved substrate part is manufactured using a flexible substrate, and the base substrate part and the curved substrate part are connected by soldering or the like.

In addition, according to the present invention, a prompt and accurate response is performed according to changes in fog conditions so that fog can be effectively removed from a surface.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

The invention claimed is:

1. A sensor module for installation on a surface comprising:
   a housing which has a contact face arranged and configured for installation on the surface, wherein the contact face of the housing has an opening;
   a flexible substrate having a base substrate part fixed inside the housing and a curved substrate part which extends in a bent form from the base substrate part and has an extension end
   fixed inside the housing so that a contact part of the curved substrate part is withdrawn via the opening of the housing and configured to press against the surface; and
   a temperature sensor arranged on or in the contact part of the curved substrate part and configured to measure a temperature of the surface,
   wherein the curved substrate part includes a pair of fixing pieces protruding from both sides of the extension end, and
   wherein the housing includes a pair of fitting pieces protruding from an inner wall of the housing so that a central portion of the extension end of the curved substrate part is fitted therebetween, and a pair of hooks protruding from the inner wall of the housing so that the fixing pieces are respectively hung thereon and fixed.

2. The sensor module according to claim 1, wherein the contact part of the curved substrate part presses against the surface only by means of the curvature and the elasticity of the flexible substrate.

3. The sensor module according to claim 1, wherein the curved substrate part is guided to be bent from the base substrate part by a guiding block which is arranged inside the housing.

4. The sensor module according to claim 1, wherein the flexible substrate comprises a stiffener laminated on at least part of the extension end of the curved substrate part.

5. The sensor module according to claim 1, wherein the flexible substrate comprises a stiffener laminated on at least part of the base substrate part.

6. The sensor module according to claim 1, wherein the temperature sensor comprises or is a thermistor.

7. The sensor module according to claim 1, wherein the housing further includes:
   a housing main body which has the opening and an open side which faces a side that comprises the opening; and
   a housing cover which is configured to cover the open side of the housing main body.

8. The sensor module according to claim 7, wherein the base substrate part is supported on the open side of the housing main body.

9. The sensor module according to claim 7, wherein the housing main body includes a hollow support part which protrudes in a hollow form from a inner surface of the contact face, has an open side at the protruded end and is configured to support a central portion of the base substrate part.

10. The sensor module according to claim 1, further comprising a connector connected to substrate terminals of the base substrate part by connector terminals while the connector is aligned by aligning protrusions fitted to aligning holes of the base substrate part.

11. The sensor module according to claim 1, wherein the base substrate part includes extending pieces which respectively extend from both sides of the base substrate part while the curved substrate part is disposed therebetween and which are fixed inside the housing.

12. The sensor module according to claim 11, wherein each of the extending pieces extend while being spaced apart from the curved substrate part.

13. An auto defog sensor comprising the sensor module according to claim 1, and further comprising a humidity sensor arranged and configured to measure an ambient humidity.

14. The auto defog sensor according to claim 13, wherein the temperature sensor is integrated in a semiconductor chip and wherein the humidity sensor is integrated in the same semiconductor chip.

15. The auto defog sensor according to claim 13, further comprising a second temperature sensor mounted on the base substrate part which is arranged and configured to measure an ambient temperature and wherein the humidity sensor is mounted on the base substrate part.

16. The auto defog sensor according to claim 15, wherein the second temperature sensor is integrated in a semiconductor chip and wherein the humidity sensor is integrated in the same semiconductor chip.

17. The auto defog sensor according to claim 15, wherein the housing comprises an air inlet and a hollow accommodating part,
wherein the air inlet is formed in a side which faces the contact face of the housing corresponding to the second temperature sensor; and
wherein the hollow accommodating part protrudes in a hollow form from a surrounding inner wall of the air inlet and is configured to accommodate the second temperature sensor.

18. The auto defog sensor according to claim 17, further comprising a sealing tape configured to seal between the hollow accommodating part and the base substrate part.

19. The auto defog sensor according to claim 17, further comprising a control circuit module mounted on the base substrate part.

* * * * *